Nov. 25, 1969    D. S. REYNOLDS ET AL    3,479,949
BEVERAGE BREWING MACHINE
Filed Sept. 18, 1967    4 Sheets-Sheet 1
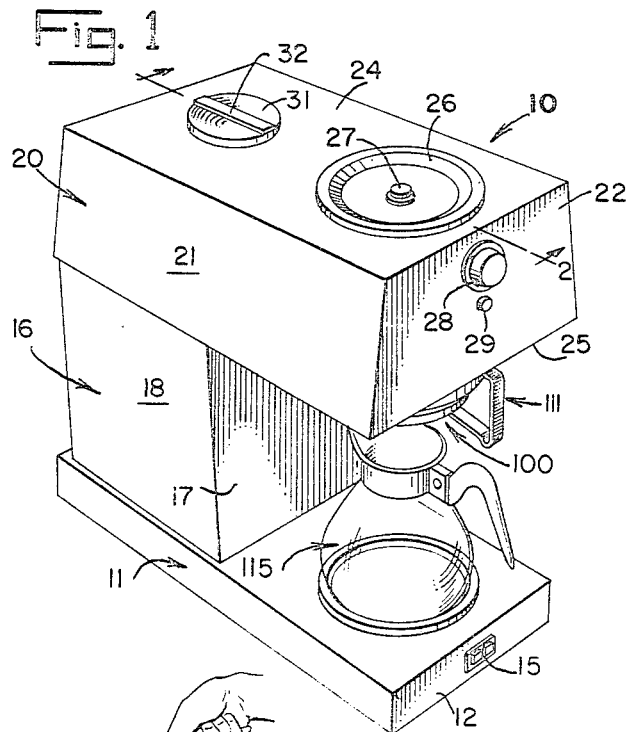
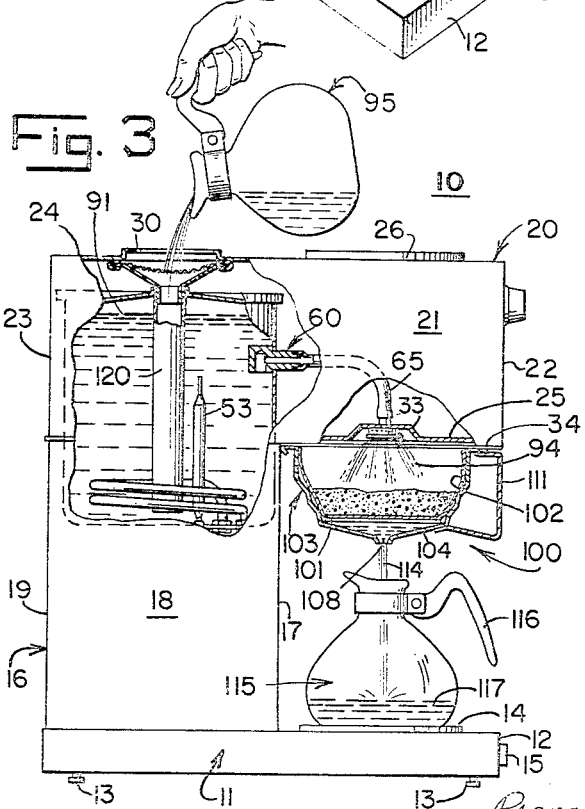
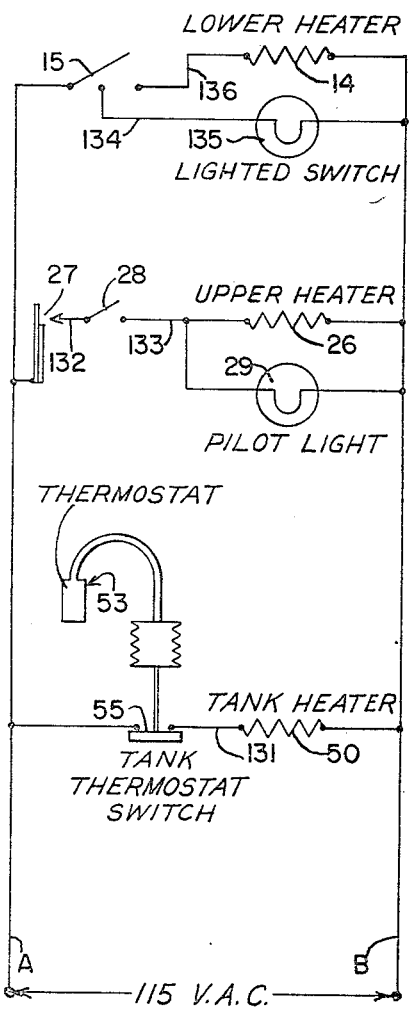
INVENTOR.
DONALD S. REYNOLDS
HARVEY R. KRUEGER
BY
Prangley, Baird, Clayton, Miller & Vogel
ATTORNEYS

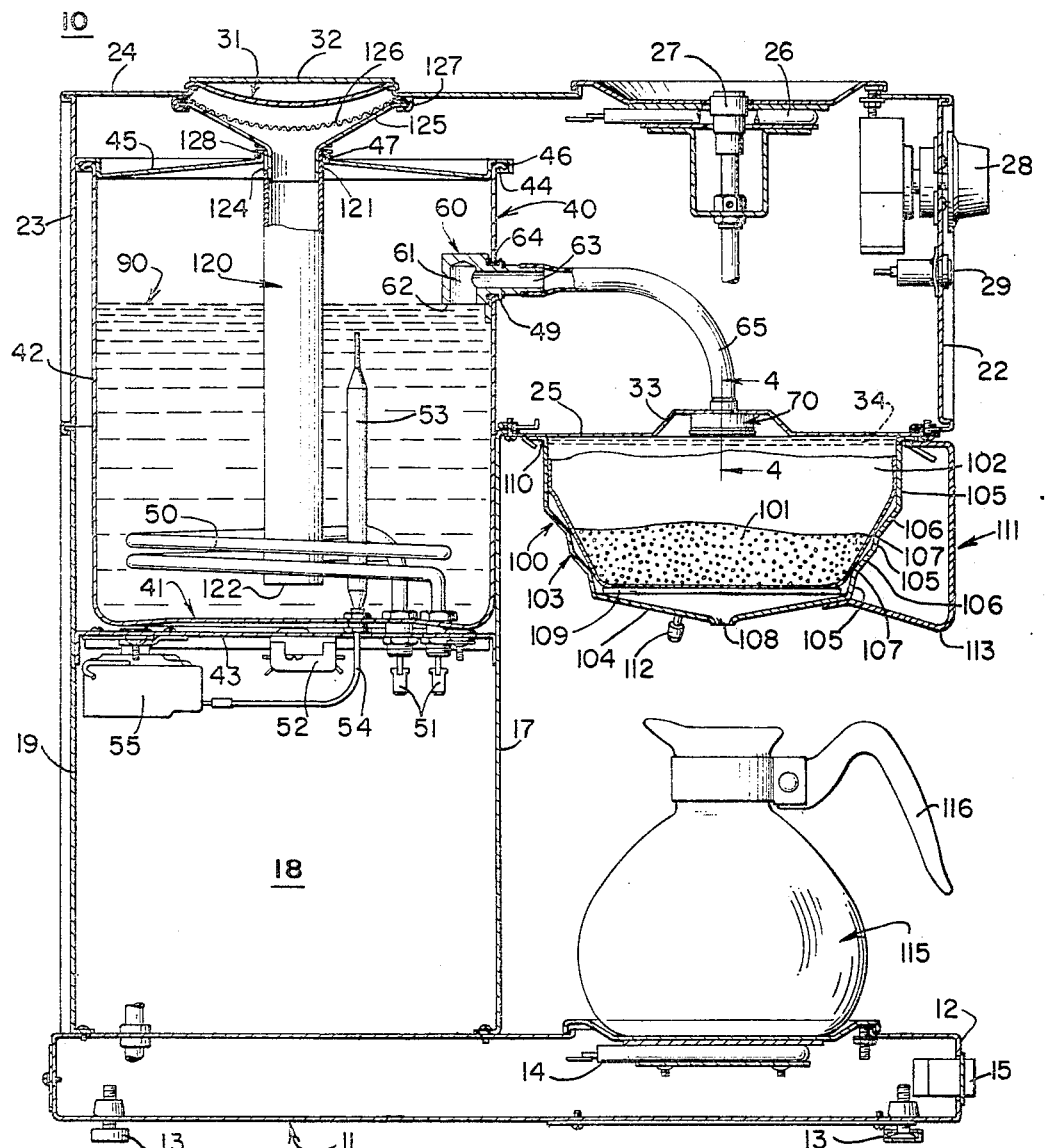

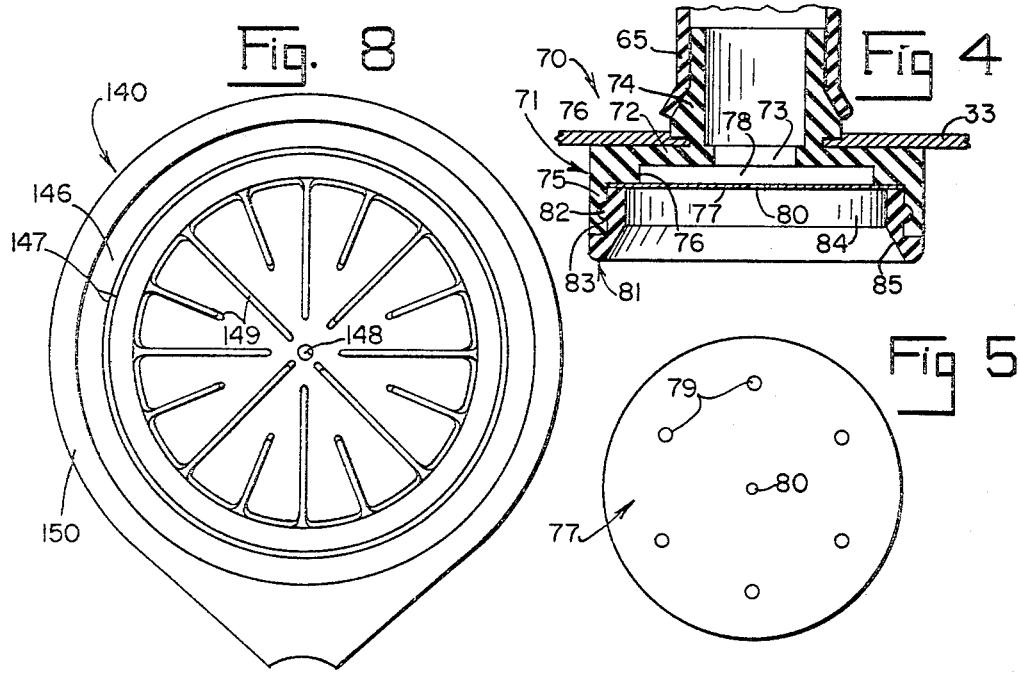
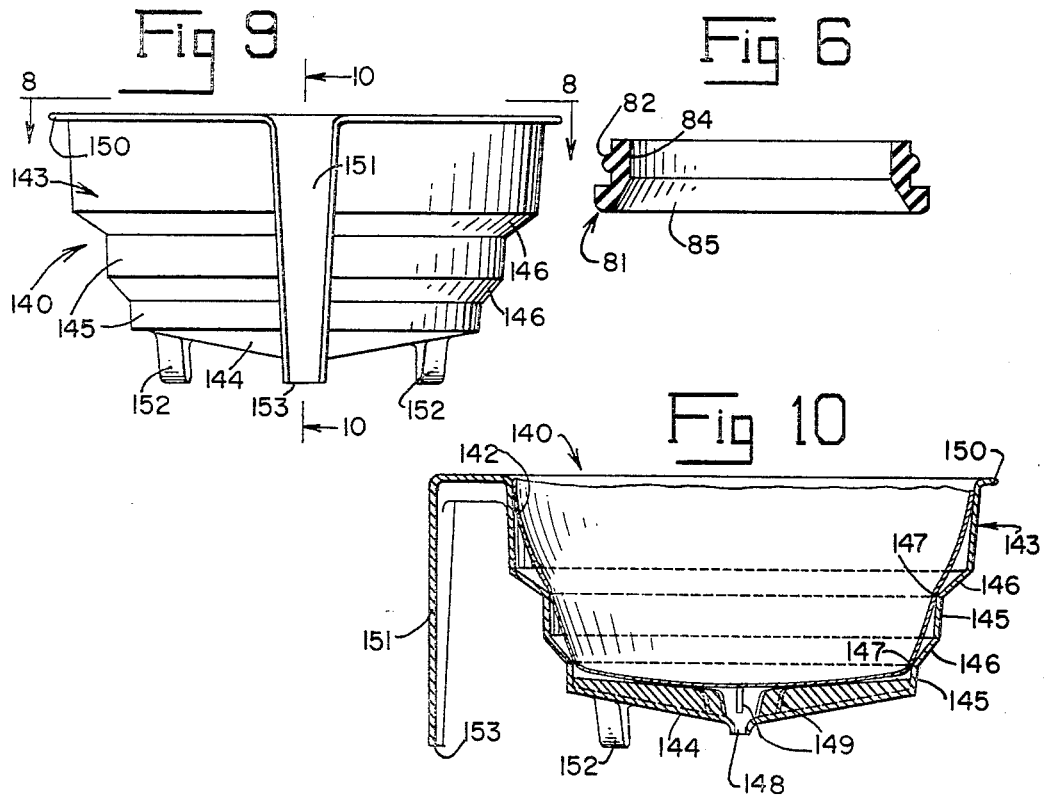

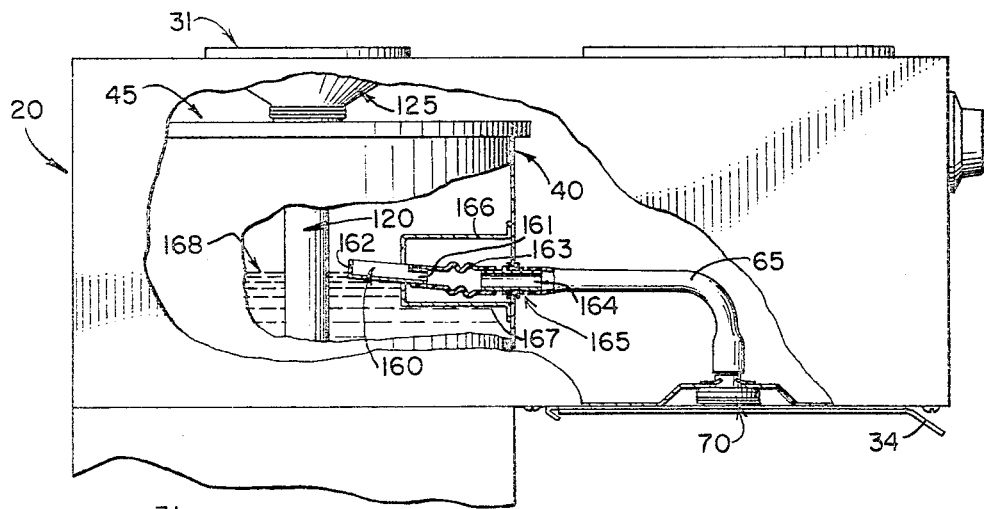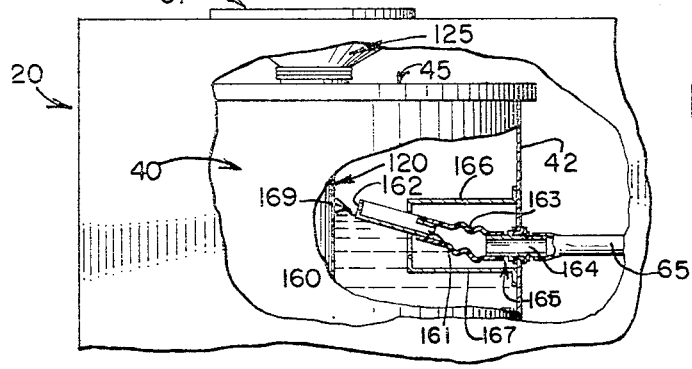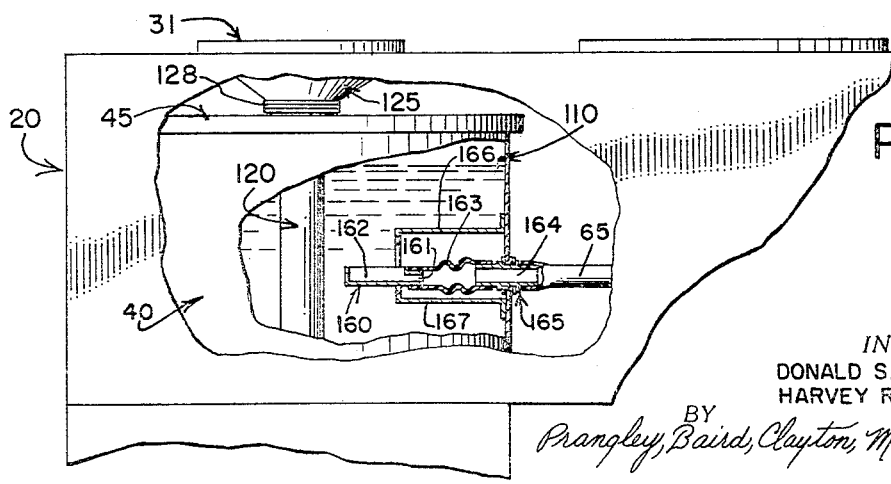

United States Patent Office 3,479,949
Patented Nov. 25, 1969

3,479,949
BEVERAGE BREWING MACHINE
Donald S. Reynolds, Glencoe, and Harvey R. Krueger, Carpentersville, Ill., assignors to Reynolds Products, Inc., Rolling Meadows, Ill., a corporation of Illinois
Filed Sept. 18, 1967, Ser. No. 668,384
Int. Cl. A47j 31/10, 31/56
U.S. Cl. 99—282
30 Claims

ABSTRACT OF THE DISCLOSURE

There is disclosed herein a beverage brewing machine including a water tank having a side wall and a bottom wall. A cover for the tank having an opening therein is disposed on top of the water tank. Thermostatically controlled heating means is disposed within the water tank for heating water therein. The water tank has an outlet in the side wall thereof disposed substantially below the top thereof. A discharge head is mounted in spaced relation to the water tank, a discharge water line connecting the outlet and the discharge head. A brew basket is disposed below the discharge head for receiving hot water therefrom. An upstanding tube is disposed in the water tank in communication with the opening in the cover. The tube terminates near the bottom of the tank and has an inner diameter substantially greater than the inner diameter of the discharge outlet, so that upon pouring a beaker of cold water through the cover and into the tube the hot water disposed in the tank will be displaced above the discharge outlet for flow therethrough.

---

The present invention relates to machines for brewing beverages such as coffee, and it relates more particularly to beverage brewing machines of the type wherein hot water is continuously maintained in a water tank, and when it is desired to brew a quantity of the beverage, a predetermined quantity of cold water is introduced into the machine and fed into the bottom portion of the water tank, thereby causing hot water within the water tank to be displaced through a discharge outlet spaced above the bottom of the water tank and to cover a beverage producing material such as ground coffee and thence into an associated beverage receiving beaker.

In one current form of beverage brewing machine now in use, there is provided a water receiving basin disposed above a water tank, a standpipe or tube connecting the bottom of the water receiving basin to the lower portion of the water tank. In operation of such structure, the cold water is first poured into the water receiving basin and then flows by gravity through the standpipe to the bottom of the water tank where it causes hot water contained in the tank to be displaced from the upper end thereof. In such current machine the standpipe comprises a tube having a relatively small internal diameter so as deliberately to reduce the flow rate of cold water into the water tank with the intent that this will prevent excessive intermixing of the incoming cold water with the hot water in the water tank. Because the water receiving basin and the relatively small diameter standpipe are used, such machine has the inherent disadvantage that the full quantity of cold water cannot be received in the water tank for heating therein until a substantially equal quantity of hot water has been displaced therefrom, thereby delaying the hot water recovery rate of the machine. However, during peak periods of usage it is desirable to heat the incoming cold water as rapidly as possible, and in a machine of the type described, the full quantity of incoming cold water cannot be heated until the brewing cycle is completed.

Accordingly, it is a primary object of the invention to provide an improved beverage brewing machine which eliminates the water receiving basin, the water tank being adapted immediately to receive the full quantity of cold water for heating therein while hot water within the water tank continues to flow through the discharge outlet therein.

Because the standpipe in a beverage brewing machine is constantly exposed to water at high temperatures, the hot water within the standpipe tends to "lime-out" and form scales on the internal wall thereof. In those machines which utilize standpipes having small internal diameters, the scales formed thereon further reduce the diameter of the standpipe and impede the flow of water therethrough, thereby reducing the efficiency of the machine and presenting a constant cleaning chore to the user.

It is, therefore, a further object of the invention to provide an improved beverage brewing machine wherein the tube for pouring water into the water tank is of sufficiently large diameter so as to obviate any of the problems previously caused by scaling on the inner surface of a standpipe having a relatively small inner diameter.

Still another object of the invention is to provide an improved beverage brewing machine of the character described wherein the means for discharging water from the water tank is of a unique configuration so as to prevent drippage from the water tank which is normally caused by the heating and consequent expansion of the cold water introduced into the tank.

Still another object of the invention is to provide, in a beverage brewing machine of the character described, a floating cup disposed within the water tank and connected through a flexible tube to the discharge outlet of the water tank, the cup being adapted to float on top of the water disposed within the tank so as to allow for the expansion of cold water being heated in the tank, whereby the cup and the flexible tube cooperate to prevent drippage of the expanding water through the discharge outlet.

It is a further object of the invention to provide, together with the floating cup arrangement heretofore described, upper and lower stop members disposed in the water tank which are effective to limit movement of the cup between two predetermined positions relative to the discharge outlet during a discharge cycle, the upper member serving to prevent the cup from being forced against the side wall of the water tank so as to block the discharge outlet and the lower member serving to limit downward movement of the cup during the discharge cycle, the upper stop member and the cup being sufficiently spaced to allow upward movement of the cup in response to the expansion of the cold water being heated.

Still another object of the invention is to provide an improved brew basket for use in a beverage brewing machine of the character described, the side wall and bottom wall of the brew basket having a configuration such that the greater portion of a disposable filter cup positioned therein is spaced from the side wall and bottom wall of the brew basket, thereby to facilitate the flow of hot water through the filter at a relatively high rate and over a relatively large area.

A further object of the invention is to provide a brew basket of the character described which is comprised of a unitary member of plastic material.

Still a further object of the invention is to provide an improved discharge head for use in combination with a beverage brewing machine, the discharge head being adapted to spray the discharging fluid in a plurality of streams of substantially uniform flow rates and in a particular overall pattern.

In accordance with one aspect of the invention there is provided a beverage brewing machine comprising a water tank having a side wall and a bottom wall and having a cover therefor with an opening therein, the cover being disposed on top of the water tank. Thermostatically controlled heating means is disposed within the water tank for heating and maintaining water within the tank at a beverage brewing temperature. An outlet is provided in the side wall of the water tank and is disposed substantially below the top of the water tank. A discharge head is provided and mounted in spaced relation to the water tank, a discharge water line connecting the discharge outlet in the water tank and the discharge head. A brew basket is disposed below the discharge head for receiving beverage producing material to be covered by hot water from the discharge head. An upstanding tube is disposed in the water tank in communication with the opening in the cover, the tube terminating near the bottom of the water tank, whereby a manually manipulatable cold water beaker may be employed for pouring a predetermined quantity of cold water through the opening in the cover so as to cause cold water to flow by gravity through the tube into the bottom portion of the water tank in an amount substantially equal to the amount of hot water to be displaced from the water tank through the discharge line to cover the beverage producing material and thereby cause a beverage extract to flow into an associated beverage receiving beaker in an amount corresponding to that amount of cold water initially in the cold water beaker. The tube has an inner diameter substantially greater than the inner diameter of the discharge outlet so that the flow rate of cold water through the tube and into the bottom of the tank substantially exceeds the flow rate of hot water from the water tank through the discharge outlet. Because of the difference in flow rates, the pouring of the full predetermined quantity of cold water into the opening in the cover and through the tube to the bottom of the water tank causes hot water therein to be displaced upwardly above the discharge outlet, with the full predetermined quantity of cold water being received by the water tank for heating therein while the upwardly displaced hot water continues to flow out of the tank through the discharge outlet until the level of water in the water tank drops below the discharge outlet.

Further features of the invention pertain to the particular arrangement of the elements of the beverage brewing machine, whereby the above-outlined and additional operating features thereof are attained.

The invention, both as to its organization and method of operation, together with further objects and advantages thereof, will best be understood by reference to the following specification when taken in connection with the accompanying drawings, in which:

FIGURE 1 is a perspective view of a beverage brewing machine embodying the present invention;

FIG. 2 is an enlarged view in vertical section of the beverage brewing machine of the present invention taken along the line 2—2 of FIG. 1, and illustrating the beverage brewing machine arranged preparatory to a brewing cycle with the water tank substantially full and a beverage material in the basket provided therefor;

FIG. 3 is an elevational view of the beverage brewing machine illustrated in FIG. 1, with parts thereof broken away and diagrammatically illustrating the operation of the machine in the middle of a brewing cycle, with cold water being introduced through the top of the machine so as to flow into the bottom of the water tank and force hot water through the discharge outlet to the discharge head above the brew basket;

FIG. 4 is an enlarged view in vertical section taken along the line 4—4 of FIG. 2 and illustrating the construction of the discharge head in greater detail;

FIG. 5 is a plan view of the thin disc provided in the discharge head and illustrating the arrangement of the discharge openings therein;

FIG. 6 is a view in vertical section of the retaining means used to position the thin disc illustrated in FIG. 5 in the discharge head, as shown in FIG. 4;

FIG. 7 is one form of electrical circuit which may be employed with the beverage brewing machine disclosed herein;

FIG. 8 is a plan view of a second embodiment of the brew basket forming part of the subject matter of the present invention, taken in the direction of the arrows along the line 8—8 in FIG. 9;

FIG. 9 is an elevational view of the second embodiment of the brew basket forming part of the present invention;

FIG. 10 is a view in vertical section of the second embodiment of the brew basket, taken along the line 10—10 in FIG. 9 and illustrating the configuration thereof in greater detail;

FIG. 11 is a fragmentary view of a machine similar to FIG. 2, but illustrating a modified form of the water tank discharge means employing the floating cup therein to accommodate expansion of the cold water during heating thereof;

FIG. 12 is a fragmentary view similar to FIG. 11, but illustrating the position of the floating cup in its position of engagement with the upper stop member upon the upward displacement of hot water within the water tank; and FIG. 13 is a fragmentary view similar to FIGS. 11 and 12, but illustrating the position of the cup during a brewing cycle of the machine.

Referring now to the drawings and more particularly to FIGS. 1 through 3 thereof, there is illustrated a beverage brewing machine 10 which may be used for brewing coffee or the like. The beverage brewing machine 10 includes a generally rectangular base portion 11 having a forward control panel 12. A plurality of adjustable legs 13 is provided in the base 11 for properly seating the machine on a counter top or the like. A lower heating unit 14 is provided on the upper surface of the base 11 and is disposed adjacent the front end thereof. The lower heating unit 14 is adapted to receive an associated liquid receiving beaker thereon. A lighted switch 15 is provided on the control panel 12 for controlling operation of the lower heating unit 14.

The machine 10 further includes a lower housing designated generally as 16, defined by an upstanding front wall 17, a pair of side walls 18 and a rear wall 19. An upper housing 20 is mounted on the lower housing 16 and includes the forwardly extending side walls 21, a front control panel 22, a rear wall 23, a top wall 24 and a bottom wall 25. As seen in the drawings, the upper housing 20 is coextensive in length to the base 11. The top wall 24 is provided with an upper heating unit 26 substantially adjacent to the front end thereof. The heating unit 26 is provided with a centrally disposed thermal-responsive switch 27, a manual control switch 28 being provided on the front wall 22 for controlling operation of the heating unit 26. A pilot light 29 is also provided on the front panel 22 and is energized when the switch 28 is in an "on" position. The top wall 24 of the upper housing 20 is further provided with an opening 30 therein (FIG. 3), which opening is normally closed by a cover 31 having a strap handle 32. The upper and lower housings 16 and 20 cooperate to provide an enclosure for a water tank 40.

The water tank 40 includes a bottom wall 41 and a cylindrical side wall 42, the tank 40 being disposed upon a partition 43 which is provided in the lower housing 16. The upper end of the water tank 40 is provided with an outwardly turned annular lip 44. A cover 45 is disposed over the tank 40, the cover having a downwardly extending annular channel 46 formed thereon about the periphery thereof adapted to cooperate with the annular lip 44 on the water tank 40, thereby to prevent lateral movement of the cover 45 relative to the water tank 40. The cover 45 is provided with a centrally disposed and upwardly extending annular flange 47 which defines a centrally disposed opening therein adapted to receive the upper end of an upstanding tube 120 as hereinafter described. The side wall 42 of the water tank 40 is provided with an opening 49 therein which is disposed substantially below the upper end of the water tank and is adapted to receive and support a discharge block 60 therein all as described more fully hereinafter.

A heating coil 50 is disposed within the water tank 40 substantially adjacent to the bottom wall 41 thereof, the terminals 51 of the heating coil 50 extending through the bottom wall 41 of the water tank and the partition 43 in the lower housing for connection with suitable conductors (not shown) to a terminal block 52 carried below the partition 43. A temperature responsive element or thermostat 53 is disposed within the water tank 40, the lower end 54 of the thermostat 53 extending through aligned openings in the bottom wall 41 and the partition 43 for connection to a tank thermostat switch 55 in a conventional manner. The arrangement is such that water in the water tank 40 is constantly maintained at an elevated temperature. This makes it possible to promptly draw off a supply of hot water from the water tank for the purpose of making coffee extract in a manner to be described.

Hot water is drawn off through the discharge block 60 disposed in the side wall of the tank, the discharge block 60 including a vertically disposed passage 61 extending upwardly from the bottom surface 62 of the block 60 and terminating as a discharge outlet 63 disposed normal to the passage 61. The discharge outlet 63 extends through opening 49 in the side wall of the water tank 40, a rubber gasket 64 being disposed about the discharge outlet 63 where it passes through the opening 49 thereby to prevent water from leaking therebetween. One end of a discharge line 65 is connected to the discharge outlet 63 of the block 60, the other end thereof being connected to a discharge head 70 which is mounted in spaced relation to the water tank 40 and disposed below the opening 49 in the side wall of the water tank, the discharge head 70 being located below an upwardly deformed portion 33 of the bottom wall 25 of the upper housing 20.

It will be understood that upward displacement of hot water within the tank 40 causes hot water to rise in the passage 61 until it reaches the discharge outlet 63, at which time hot water will flow through the discharge block 60, the discharge line 65 and the discharge head 70 until the water level in the water tank drops below the lower surface 62 of the discharge block. When the water level drops below the lower surface 62 of the discharge block, the passage 61 therein provides an air gap between the discharge outlet 63 and the bottom surface 62 of the discharge block so as to prevent the siphoning of additional water from the water tank 40. The lowest portion of the discharge outlet 63 and the lower surface 62 of the block are sufficiently spaced so that the passage 61 accommodates the expansion of cold water being heated in the tank without drippage thereof through the discharge outlet 63.

In a typical construction of the discharge block 60, the block itself is made of stainless steel, the passage 61 has an inner diameter of approximately ½ inch, the discharge outlet 63 and the discharge line 65 each have an inner diameter of approximately 5/16 of an inch and the lowest portion of the discharge outlet 63 is disposed about 5/16 inch above the bottom surface 62 of the block. The passage 61 is formed of a larger diameter than the discharge outlet 63 to insure that a full stream of hot water enters the outlet 63, whereas if the passage 61 and outlet 63 were of complementary diameters, it is possible that air bubbles could be entrained therein.

As noted, the discharge line 65 is connected to the discharge head 70, the discharge head 70 being adapted to spray hot water in a plurality of streams at substantially uniform flow rates and in a particular overall pattern. The discharge head 70 is best illustrated in FIGS. 4, 5 and 6, and comprises a spray nozzle designated generally as 71. The nozzle 71 includes a generally circular base 72 having a centrally disposed opening 73 therethrough. A tubular flange 74 extends normally upward from the base 72 for connecting the discharge line 65 to the opening 73 in the nozzle 71. An annular flange 75 extends from the base 72 in a direction opposite to the tubular flange 74, the annular flange 75 being provided with an annular stepped portion 76 thereon disposed adjacent to the lower surface of the base 72.

A thin disc 77 is disposed within the annular flange 75 and engages the annular stepped portion 76, the axis of the disc 77 being in longitudinal alignment with the axis of the opening 73 in the base, whereby the disc 77 and the annular stepped portion 76 and the base 72 cooperate to define a chamber 78 therebetween. As best seen in FIG. 5, the disc 77 has a plurality of equiangularly spaced openings 79 and a centrally disposed opening 80 therein for discharging fluid from the chamber 78 in a plurality of streams having uniform flow rates and in a particular overall pattern, all as described hereinafter.

A retaining means 81 is provided to position the disc 77 within the annular flange 75 and in abutting engagement with the stepped portion 76. The retaining means is provided with a bead 82 on the outer surface thereof which is adapted to engage a corresponding groove 83 provided on the inner surface of the annular flange 75, whereby the retaining means 81 is held in position.

The inner surface of the retaining means includes a generally cylindrical section 84 having a diameter which only slightly exceeds the diameter of a circle tangent to the outermost points of the plurality of openings 79 in the disc, the inner surface of the retaining means terminating in an outwardly flared section 85.

The close proximity of the cylindrical section 84 to the openings 79 causes hot water discharging therethrough to be attracted to and adhere to the cylindrical side wall 84, and because of the boundary layer effect, some of the water of the discharging streams will thus flow along the outwardly flared portion 85 whereby the water is discharged in a conical pattern from the discharge head 70, as seen in FIG. 3.

In a typical embodiment of the discharge head 70, the spray nozzle 71 is comprised of a silicone rubber composition, the base 72 has an outer diameter of 1 7/32 inches, the opening 73 is 5/16 inch in diameter, the stepped portion 76 is approximately .890 inch in diameter and is offset from the base approximately ⅛ inch, the cylindrical section 84 of the retaining means 80 has a range of .873 to .877 inch, the flared section 85 is inclined outwardly at an angle of 25° relative to the cylindrical section and terminates in an opening of approximately 1 inch, and the cylindrical section 84 has a length of about .131 inch. The disc 77 is about 1.089±.004 inch in diameter and is approximately .007±.001 inch thick. Each of the openings 79 is .081±.001 inch in diameter, the centers thereof being located on a circle having a diameter of .780±.002 inch, and the center opening 80 is .046±.001 inch in diameter.

When assembled, the inner diameter of the cylindrical section 84 of the retaining means 81 exceeds the diameter of a circle tangent to the outermost points of the openings 79 by a bolt 0.14 inch, whereby water discharging through the openings 79 is in close proximity to the cylindrical section 84 and is attracted thereto and then flows along the outwardly flared section 85 for discharge in a conical spray, as indicated at 94 in FIG. 3.

The relationship of the diameter of each of the equiangularly spaced openings 79 to the thickness of the disc 77 is important for a number of reasons. To obtain a uniform discharge cycle from the machine, it is necessary that the flow rate of the hot water discharging through the discharge head 70 remain fairly constant regardless of changes in viscosity of the hot water caused by variations in the temperature thereof. The velocity or flow rate of a fluid in relationship to the viscosity thereof is set forth in Poiseulle's law, wherein the flow rate, at a constant pressure, is proportional to the fourth power of the radius of the discharge orifice over the length of the orifice times the coefficient of viscosity of the fluid. It is, therefore, possible to minimize the effect of changes in viscosity of the fluid caused by temperature variations thereof on the flow rate of the fluid by changing the ratio of the radius of the discharge orifice to the length thereof.

In addition to the necessity of obtaining a fairly constant flow rate at various temperatures to achieve a uniform discharge cycle, a minimum flow rate at the pretermined pressure is necessary so that fluid discharging through the openings 79 will be attracted to the cylindrical section 84 of the retaining means.

When the diameter of each of the openings 79 is at least eight times the thickness of the disc 77, the flow rate of the discharging hot water will be relatively constant over a fairly wide range in temperature thereof, with the change in viscosity of the water having little effect thereon, and the flow rate of the discharging fluid will also be sufficient to cause the hot water to be attracted to the cylindrical section 84 so as to achieve the conical spray pattern during most of the discharge cycle.

The thinness of the disc in relation to the diameter of the openings therethrough is important for yet another reason. Because of the relatively high temperature of the water flowing through the discharge head, there is the possibility that lime will build up in the discharge orifices and reduce the size thereof. By reducing the thickness of the disc the effective surface area of the openings upon which lime can build up is also reduced.

A brew basket 100 is carried by the upper housing 20 directly below the discharge head 70, whereby the spray openings 79 and 80 in the discharge head 70 cause hot water to be distributed over ground coffee 101 that is positioned on the bottom of a cup shaped member 102 of filter paper disposed within the basket 100.

The brew basket 100 illustrated in FIGS. 2 and 3 comprises an annular side wall 103 and a bottom wall 104 which define a hollow body of generally funnel-like configuration. The side wall 103 is defined by a plurality of generally vertically arranged sections 105 and inwardly inclined sections 106 which are alternately arranged, whereby the interfaces between the adjacent inclined sections and vertical sections define a plurality of coaxial spaced-apart circular support surfaces 107 which decrease in diameter from the top of the basket to the bottom thereof.

The bottom wall 104 is provided with a centrally disposed discharge opening 108 therein for discharging a beverage extract therefrom. A grid-like support for the bottom of the filter cup 102 is provided by a serpentine wire member 109 which rests on the bottom wall 104 of the basket. The upper end of the side wall 103 of the basket is provided with a radially extending annular flange 110 that is arranged to slide along angle members 34 which are disposed on the bottom wall 25 of the upper housing, whereby the basket 100 is removably carried by the upper housing.

The basket 100 further comprises a handle 111 formed integral therewith, thereby to facilitate removal of the basket 100 from the machine 10 for removal of the filter cup 102 and the spent coffee grounds and replacement thereof. The basket 100 is also provided with a plurality of support legs 112 (one only being shown) which are integral with the lower wall 104 thereof and extend downwardly therefrom. The handle 111 terminates in a lower surface 113 which lies in a plane common to the terminal ends of the support legs 112, whereby the lower end of the handle 111 and the support legs 112 cooperate to support the basket 100 in a horizontal plane on an associated member when the basket is removed from the machine.

As best seen in FIG. 2, the side wall of the disposable filter cup 102 rests against the annular support surfaces 107 of the basket, whereby the major portion of the cup is spaced from the side wall 103, the grid-like support means 109 also serving to space the bottom of the cup from the bottom wall 104. As a result of this spacing the filter cup does not adhere to the side wall 103 when hot water is sprayed thereinto from the discharge head 70, whereby the flow therethrough of filtered water can take place over a relatively large area with the result that the time required for water to pass through the basket 100 is reduced to a minimum.

As best seen in FIG. 3, the beverage extract that is formed as the result of the spraying of hot water over the ground coffee 101 in the basket 100 flows downwardly as at 114 through the discharge spout 108 into a beaker 115 that is located therebelow on the lower heating unit 14. The beaker 115 may be a conventional glass beaker provided with a handle 116. The liquid extract, which in this case is coffee, appears therein as indicated at 117. By providing predetermined amounts of ground coffee 101 on the disposable filter cup 102 and maintaining the temperature of the water in the water tank 40 at a predetermined value, it is possible to make the coffee extract 114 under identical controlled conditions for each brewing cycle.

In accordance with the invention, provision is made for displacing a predetemined quantity of hot water from the upper portion of the water tank 40 by introducing an equal amount of water, preferably cold water, in the lower portion of the water tank. For this purpose, the upstanding tube 120 is provided. The upper end 121 of the tube is provided with a plurality of nibs (not shown) adapted to engage the upstanding annular flange 47 of the cover 45, whereby the tube 120 is removably carried by the cover.

The tube 120 extends downwardly within the tank 40, the lower end 122 thereof terminating near the bottom wall 41 of the tank. The upper end of the tube 120 is provided with a generally rectangular notch 124 which begins below the cover 45 and extensd upwardly beyond the flange 47. The notch 124 places the interior of the water tank 40 in direct communication with atmosphere and provides for the escape of air from the upper end of the water tank 40 when hot water within the tank is upwardly displaced therein in response to the pouring of cold water through the tube 120.

A funnel 125 is disposed between the upper end 121 of the tube 120 and the top wall 24 of the upper housing 20, where it terminates in registry with the opening 30 in the top wall 24. A filter 126 is provided within the funnel 125 to catch any large objects which may fall into the opening 30 when the cover 31 is removed therefrom. As best seen in FIG. 3, the funnel 125 is adapted to direct the cold water poured through the opening 30 into the upper end of the tube 120. Also as shown in FIG. 2, a gasket 127 is disposed about the upper end of the funnel 125 to provide a seal between the funnel 125 and the upper wall 24 of the housing 20. A coil spring 128 is interposed between the funnel 125 and the cover 45, the spring 128 serving to bias the funnel 125 upwardly so as to insure a tight seal between the gasket 127 and the wall 24, the spring 128 also serving to maintain the cover 45 in proper position upon the tank 40.

In accordance with the present invention, the inner diameter of the tube 120 is substantially greater than the inner diameter of the discharge outlet 63 in the discharge block 60, whereby the flow rate of cold water flowing through the tube 120 and into the bottom of the water tank 40 substantially exceeds the flow rate of the hot water out of the water tank 40 through the discharge block 60. In a typical embodiment the tube has an inner diameter of about 1 3/16" and the inner diameter of the discharge outlet 63 is about 5/16".

Because the flow rate of the incoming water exceeds the flow rate of the outgoing hot water, the pouring of cold water into the tube to the tank bottom causes hot water, which is normally disposed at the position illustrated at 90 in FIG. 2, to be upwardly displaced within the water tank above the discharge block 60, to the point illustrated as 91 in FIG. 3. It will be appreciated therefore that the full predetermined quantity of cold water may be immediately received by the water tank for heating therein. The hot water in the upper portion of the water tank continuing to flow out of the tank through the discharge outlet until the level of water tank drops below the lower surface 62 of the discharge block 60, at which time the siphoning effect caused by the relative positions of the discharge head 70 and the discharge block 60 will be broken, thereby positively to terminate the outflow of hot water from the water tank 40.

The discharge outlet 63 is suitably positioned in the side wall of the tank such that the volumetric capacity of the water tank 40 between the discharge outlet 63 and the top of the tank is sufficient to receive at least about 60 ounces of water when the hot water in the water tank is displaced to the upper portion thereof, the volumetric capacity of the tank 40 below the discharge outlet 63 being about 6 quarts of water. The upper portion of the water tank has a capacity corresponding to that of an associated cold water beaker 95, whereby the full quantity of cold water contained in the beaker 95 may be poured into the water tank 40 and will cause a substantial equal amount of hot water to be displaced therefrom, as illustrated diagrammatically in FIG. 3.

When the hot water is displaced upwardly within the tank 40, it flows through the discharge outlet 63 and the discharge line 65 and is sprayed out through the discharge head 70 over the ground coffee 101 disposed within the basket 100. The coffee extract 114 flows through the discharge spout 108 in the basket 100 into the beaker 115 disposed thereunder.

While the upper portion of the tank is adapted to receive an amount of hot water equal to that carried within the cold water beaker 95, it will be apparent that a lesser amount of cold water may be poured into the tank 40 to cause a corresponding lesser amount of hot water to be discharged therefrom.

As heretofore noted, discharge of hot water from the tank 40 terminates when the water reaches the level 90 illustrated in FIG. 2. Because the bottom surface 62 of the block 60 is disposed below the discharge outlet 63 therein, the standby level of water within the tank 40 is therefore normally disposed below the discharge outlet 63, and as previously described, the distance between the discharge outlet 63 and the bottom surface 62 of the block 60 is sufficient to accommodate expansion of the cold water within the tank upon the heating thereof to prevent drippage of water through the discharge outlet 63.

Referring now to FIG. 7, there is shown a typical electrical circuit for the beverage brewing machine 10, the input to the electrical circuit of FIG. 7 being on a pair of line conductors designated at A and B and connected through suitable switches and fuses (not shown) to a suitable 115 volt 60 cycle A.C. supply. As illustrated, the conductor A is connected to one terminal of the tank thermostat switch 55, the other terminal of the thermostat switch 55 being connected through a conductor 131 to one terminal of the heating coil 50 for the water tank 40. The second terminal of the coil 50 is connected to the conductor B. The operation of the heating unit 50 under control of the thermostat switch 55 is fairly conventional, the switch 55 being closed to provide a circuit through the heating coil 50 when the temperature of the water within the tank drops below a preselected value.

As previously noted, the upper heating unit 26 is controlled by both a thermostatically controlled switch 27 and a manual switch 28, one terminal of the switch 27 being connected to the main conductor and the other terminal therof being connected to a conductor 132 which in turn is connetced to one terminal of the manually controlled switch 28. The other terminal of the manual switch 28 is connected to a conductor 133, one terminal of the pilot light 29 being connected to one branch of the conductor 133 and the upper heating unit 26 also having one terminal connected to the conductor 133. The other terminal of the pilot light 20 is connected to the line conductor B; similarly, the other terminal of the heating element 26 is also connected to the line conductor B.

The upper heating unit 26 is used to maintain a previously brewed beaker of coffee at a predetermined temperature. In operation, the beaker containing the brewed coffee is placed on the upper heating unit 26 and the manual control switch 28 is closed. If the brewed beverage within the beaker is already at the predetermined temperature, the thermostatically controlled switch 27 will remain open so as to open the circuit through the heating element 26, the switch 27 remaining open so long as the beverage is at the predetermined temperature. As the beverage within the beaker cools below the predetermined temperature, the thermostatically controlled switch 27 closes to complete the circuit through the line conductor A, the switch 27, the conductor 132, the switch 28, the conductor 133, the upper heating unit 26, the pilot light 29 and the line conductor B, thereby to energize the heating unit 26 so as to heat the beverage within the beaker. When the temperature of the beverage in the beaker reaches the predetermined value, the thermostatically controlled switch 27 opens so as to break the circuit and deenergize the heater 26. The preferred temperature at which the beverage should be maintained by the heating unit 26 is 175°±5° F.

One terminal of the switch 15 for the lower heater 14 is also connected to the main conductor A, a second terminal of the switch 15 being connected through a conductor 134 to one terminal of a light 135, the second terminal of the light 135 being connected to the line conductor B. A third terminal of the switch 15 is connected through a conductor 136 to one terminal of the heating element 14, the other terminal of the heating element 14 being connected to the main conductor B, whereby closing of the switch 15 causes both the heating element 14 and the light 135 to be energized.

In operation, it will be assumed that the water tank 40 is filled with water to the level indicated at 90 in FIG. 2 and that the tank heater 50 under the control of the tank thermostat 53 is energized to bring the water within the tank to a predetermined temperature, the thermostat switch 55 being closed and opened in such manner as to maintain the temperature of the water in the water tank 40 in the neighborhood of 193°±4° F.

When it is desired to cause coffee extract to flow into the beaker 115, the latter is positioned on the heating element 14 and the control switch 15 is closed to energize the heating element 14 and also to cause the indicating light 135 for the switch to be energized. A supply of fresh ground coffee 101 is placed in the cup 102 formed by the filter paper, the cup being located in the brew basket 100. The basket 100 is then inserted below the discharge head 70. Next the cover 31 is removed and the contents of the cold water beaker 95 are poured through the opening 30 in the upper housing 20.

The cold water flows directly through the tube 120 into the lower portion of the water tank 40, thereby causing hot water contained therein to be upwardly displaced within the tank 40. Because the flow rate of the incoming cold water substantially exceeds the flow rate of the discharging hot water through the discharge outlet 63, the hot water in the tank 40 is displaced well above the discharge outlet, as shown at 91 in FIG. 3. At this time, the full quantity of cold water is disposed within the bottom portion of the tank 40 where it is subjected to maximum heating potential of the heating coil 50, while the hot water continues to be discharged from the discharge head 70 until the water level within the tank drops slightly below the bottom surface 62 of the block 60.

The hot water flowing out of the discharge head 70 is sprayed over the ground coffee 101 within the basket 100 in a uniform pattern until all of the hot water in the upper portion of the water tank flows out of the discharge water line and the water level in the water tank reaches the standby position therein, at which time the brewing cycle is completed. Because of the capacity of the tank, it is possible to immediately initiate a second brewing cycle and still obtain hot water at the required temperature.

A second embodiment of the brew basket forming part of the present invention is illustrated in FIGS. 8 through 10 and is designated generally by the numeral 140. The basket 140 includes the annular side wall 143 and bottom wall 144 defining a hollow body of funnel-like configuration. As in the first embodiment, the side wall 143 is defined by a plurality of generally vertically arranged sections 145 and inwardly inclined sections 146 which are alternately arranged, whereby the interfaces between the adjacent inclined sections and vertical sections define the plurality of coaxial spaced apart circular support surfaces 147 which decrease in diameter from the top of the basket to the bottom thereof. The bottom wall 144 of the basket is provided with a centrally disposed discharge spout 148 therein for discharging the beverage extract therefrom.

In this embodiment the grid-like support for the bottom of the filter cup 142 is provided by a plurality of radially extending ribs 149 which are integrally formed on the bottom wall 144 and extend upwardly therefrom. An annular flange 150 is provided on the side wall 143 for cooperation with the slides 34 on the housing.

The basket 140 further comprises a handle 151 formed integral therewith. The basket 140 further includes a plurality of support legs 152 which are integral with the bottom wall 144 and depend therefrom. The handle 151 terminates in a lower surface 153 which lies in a plane common to the ends of the legs 152, whereby the handle 151 and the support legs 152 cooperate to support the basket 140 in a horizontal plane on an associated member when the basket is removed from the machine. In this embodiment, the basket is formed of a unitary member molded from a plastic material such as polypropylene.

Referring now to FIGS. 11 through 13, there is disclosed a second arrangement which may be employed within the water tank 40 to prevent drippage of water through the discharge outlet caused by the expansion of the cold water being heated. As illustrated, there is provided a cup 160 which is adapted to float on the upper surface of the water contained within the water tank 40. The cup 160 is provided with a discharge conduit 161 in the side wall 162 thereof, the discharge conduit 161 being connected through a flexible tube 163 to a discharge outlet 164 provided in a modified form of discharge block 165. Because the cup 160 floats on the upper surface of the water, expansion of the cold water caused by the heating thereof causes the cup 160 to float upwardly within the water tank 40, whereby the cup 160 and the flexible tube 163 cooperate to prevent water from flowing through the discharge outlet 164.

To prevent the cup 160 from being forced against the side wall 42 of the water tank 40 during operation of the machine, the water tank 40 is provided with an upper stop member 166 which is carried by the side wall 42 and is disposed above the discharge outlet 164, the stop member 166 limiting upward movement of the cup 160 in response to upward movement of the water within the water tank 40. A lower stop member 167 also is carried by the tank wall 42 below the discharge outlet for limiting downward movement of the cup 160.

During a standby period, the cup 160 is empty and is adapted to float at an intermediate position between the upper and lower stop members, as illustrated in FIG. 11. Upon introduction of cold water into the tank, the hot water therein rises abruptly and carries the cup 160 upwardly until it engages the upper stop member 166, as shown in FIG. 12. At this time, the water overflows the upper edge of the cup 160, whereby the cup 160 floods and sinks until it engages the lower stop member 167, as illustrated in FIG. 13. The hot water will drain through the discharge conduit 162 provided in the side wall of the cup 160 and through the flexible tube 163 into the discharge outlet 164 in the block 165 for delivery at the discharge head. When the water level drops to the upper edge of the cup 160, the cup empties and returns to the intermediate position illustrated in FIG. 11, thereby abruptly terminating the water discharge cycle. The distance between the upper stop member 166 and the cup 160 is sufficient to allow the cup to float upwardly in the water tank in response to the expansion of cold water being heated in the tank, thereby to prevent drippage at the discharge head.

What is claimed is:

1. A beverage brewing machine comprising, in combination, a water tank having a side wall and a bottom wall, a cover having an opening therein and disposed on top of said water tank, thermostatically controlled heating means disposed within said water tank for heating and maintaining water within the tank at a beverage brewing temperature, a discharge outlet in the side wall of said water tank disposed substantially below the top of said water tank, a discharge head mounted in spaced relation to said water tank, a discharge water line connecting said discharge outlet in said water tank and said discharge head, means disposed below said discharge head for receiving a beverage producing material to be covered by hot water from said discharge head, and an upstanding tube disposed in said water tank in communication with the opening in said cover, said tube terminating near the bottom wall of said water tank, whereby a manually manipulatable cold water beaker may be employed for pouring a predetermined quantity of cold water through said opening in said cover and directly into said tube without the use of an intermediate water receiving means so as to cause cold water to flow by gravity through said tube into the bottom portion of said water tank in an amount substantially equal to the amount of hot water to be displaced from said water tank through said discharge line onto the beverage producing material and thereby cause a beverage extract to flow into an associated beverage receiving beaker in an amount corresponding to that amount of cold water initially in the cold water beaker, said tube having an inner diameter substantially greater than the inner diameter of said discharge outlet so that the flow rate of cold water through the tube and into the bottom of said water tank substantially exceeds the flow rate of the hot water out of said water tank through said discharge outlet, whereby the pouring of the full predetermined quantity of cold water into the opening in said cover through said tube to the bottom of said water tank causes hot water therein to be displaced to the upper portion of said water tank above said discharge outlet with the full predetermined quantity of cold water being received in the lower portion of said water tank for heating therein while the hot water in the supper portion of said water tank continues to flow out of said tank through said discharge outlet until the level of water in said water tank drops below said discharge outlet.

2. The beverage brewing machine set forth in claim 1, and further comprising a housing enclosing said water tank and said discharge line, said housing having a generally planar top wall, said top wall having an opening therein in alignment with the opening in the cover of said tank, and a funnel extending between the opening in said top wall and said tube to direct the cold water poured into the opening in said housing into said tube.

3. The beverage brewing machine set forth in claim 1, wherein the inner diameter of said tube is about 1¾₆ inches and the inner diameter of said discharge outlet is about ⁵⁄₁₆ inch.

4. The beverage brewing machine set forth in claim 1, wherein the discharge outlet in said water tank is so disposed in the side wall of said water tnak that the volumetric capacity of said water tank between the discharge outlet and the top of the water tank is sufficient to receive at least about 60 ozs. of water when the hot water in the water tank is displaced to the upper portion thereof.

5. The beverage brewing machine set forth in claim 1, wherein said water tank has a volumetric capacity approximately equal to four times the capacity of the associated beakers.

6. The beverage brewing machine set forth in claim 1, wherein said heating means comprises a generally circular heating coil disposed about and spaced from said tube, said heating coil being disposed near the bottom wall of said tank whereby the full predetermined quantity of cold water introduced near the bottom of said water tank is subjected to the maximum heating potential of said heating coil.

7. The beverage brewing machine set forth in claim 1, wherein the discharge outlet in said water tank is so disposed in the side wall of said water tank that the volumetric capacity of said water tank between the discharge outlet and the top of the water tank is sufficient to receive at least about 60 ozs. of water when the hot water in the water tank is displaced to the upper portion thereof, and the portion of the water tank below said discharge outlet has a volumetric capacity of about six quarts of water.

8. The beverage brewing machine set forth in claim 1, wherein the discharge outlet in said water tank is so disposed in the side wall of said water tank that the volumetric capacity of said water tank between the discharge outlet and the top of the water tank is equal to about one fourth of the entire volumetric capacity of said water tank from the bottom wall thereof to the top thereof.

9. The bevarage brewing machine set forth in claim 1, wherein the discharge outlet in said water tank is so disposed in the side wall of said water tank that the volumetric capacity of said water tank between the discharge outlet and the top of the water tank is sufficient to receive a quantity of water substantially equal to the capacity of the associated beaker.

10. The beverage brewing machine set forth in claim 1, wherein said discharge head comprises a spray nozzle including a base having an opening therethrough, means for connecting said base to said discharge line with said opening in communication therewith for discharging a stream of hot water therethrough, deflecting means carried by said base downstream of said opening for breaking up the stream of hot water discharging from said opening into a plurality of streams of equal flow rates, said deflecting means having a plurality of discharge openings therein for discharging the plural streams of water and having means for directing the discharge streams outwardly at a predetermined angle relative to the longitudinal axis of the opening in said base thereby to cause said hot water to be discharged in a particular overall pattern.

11. A brew basket for holding a beverage brewing material for use in a beverage brewing machine, comprising a one-piece plastic basket having an annular side wall and a bottom wall forming a hollow body of generally funnel-like configuration, the side wall of said basket being defined by a plurality of generally vertically arranged sections and inwardly inclined sections alternately arranged whereby the interfaces between the adjacent inclined sections and vertical sections define a plurality of coaxial spaced-apart circular support surfaces of decreasing diameter from the top of the basket to the bottom thereof, said bottom wall having a centrally disposed discharge opening therein for discharging a beverage extract therefrom, a plurality of radially extending ribs integrally formed on said bottom wall and extending upwardly therefrom, said plurality of support surfaces and said ribs being cooperable to receive and support an associated disposable filter within said basket, a pair of support legs carried by said bottom wall and extending downwardly therefrom, and a handle secured to said basket to facilitate handling thereof, said handle including a generally vertically arranged arm, the lower end of said arm and the lower ends of said support legs terminating in a common plane whereby said support legs and said handle cooperate to support said basket on an associated surface.

12. A discharge head for spraying fluid in a plurality of streams of substantially uniform flow rates and in a particular overall pattern comprising, in combination, a spray nozzle including a generally circular base having a centrally disposed opening therethrough, a tubular flange extending in a first direction normal to said base and surrounding said opening for connecting said base to a fluid discharge line, an annular flange extending from said base in a direction opposite to said tubular flange, said annular flange including an annular stepped portion thereon adjacent to said base, a thin disc disposed within said annular flange and in engagement with said annular stepped portion, the axis of said disc being in alignment with the axis of said opening in said base whereby said disc and said annular stepped portion and said base cooperate to define a chamber therebetween, said disc having a plurality of equiangularly spaced openings therethrough for discharging fluid from said chamber in a plurality of streams at uniform flow rates and in a particular overall pattern, and retaining means disposed within said annular flange and cooperating therewith to hold said disc in position on said annular stepped portion.

13. The combination set forth in claim 12, wherein each interface formed by the intersection of each of said plurality of openings with said base is substantially a right angle.

14. The combination set forth in claim 12, wherein the diameter of each opening of said plurality of openings is at least eight times greater than the thickness of said disc.

15. The combination set forth in claim 12, wherein said retaining means comprises a generally annular ring-like member the inner surface of said member being defined by a generally cylindrical section disposed adjacent to and in axial alignment with said disc and terminating in an outwardly flared section, the diameter of said cylindrical section being only slightly greater than the diameter of a circle tangent to the outermost points of said circumferentially spaced openings in said disc, whereby the fluid discharging through said openings will be in close proximity to said cylindrical section and will be attracted thereby so as to flow along said outwardly flared section for discharge in a conical spray.

16. The combination set forth in claim 15, wherein the diameter of said cylindrical section exceeds the diameter of the circle tangent to the outermost points of said openings by between .009 and .019 inch.

17. A beverage brewing machine comprising, in combination, a water tank having a side wall and a bottom wall, a cover having an opening therein and disposed on top of said water tank, thermostatically controlled heating means disposed within said water tank for heating and maintaining water within the tank at a beverage brewing temperature, a discharge outlet in the side wall of said water tank disposed substantially below the top of said water tank, a discharge head mounted in spaced relation to said water tank, a discharge water line connecting said discharge outlet in said water tank and said discharge head, a cup disposed within said water tank and having an outlet at one side thereof, a flexible tube connecting said cup outlet and said discharge outlet whereby said cup is movable relative to said discharge outlet in response to changes of the water level within said water tank, first stop means carried by the side wall of said water tank and disposed above said discharge outlet for limiting upward movement of said cup in response to a rise of the water level within said water tank, second stop means carried by the side wall of the water tank and disposed below said discharge outlet for limiting downward movement of said cup, said cup having a normal empty position intermediate said first and second stop means whereby the introduction of cold water into said water tank and the upward displacement of hot water therein causes said cup to rise until it engages said first stop means whereupon hot water displaced to the upper portion of said water tank overflows the edge of said cup and flows through said cup outlet and said flexible tube to the discharge outlet of said tank, the water flowing into said cup causing said cup to sink and engage said second stop means where said cup remains until the water level in said water tank drops below the upper edge of said cup whereupon said cup is adapted to assume said normal empty position intermediate said first and second stop means, means disposed below said discharge head for receiving a beverage producing material to be covered by hot water from said discharge head, and an upstanding tube disposed in said water tank in communication with the opening in said cover, said tube terminating near the bottom wall of said water tank, whereby a manually manipulatable cold water beaker may be employed for pouring a predetermined quantity of cold water through said opening in said cover and directly into said tube without the use of an intermediate water receiving means so as to cause cold water to flow by gravity through said tube into the bottom portion of said water tank in an amount substantially equal to the amount of hot water to be displaced from said water tank through said discharge line onto the beverage producing material and thereby cause a beverage extract to flow into an associated beverage receiving beaker in an amount corresponding to that amount of cold water initially in the cold water beaker, said tube having an inner diameter substantially greater than the inner diameter of said discharge outlet so that the flow rate of cold water through the tube and into the bottom of said water tank substantially exceeds the flow rate of the hot water out of said water tank through said discharge outlet, whereby the pouring of the full predetermined quantity of cold water into the opening in said cover and through said tube to the bottom of said water tank causes hot water therein to be displaced to the upper portion of said water tank above said discharge outlet with the full predetermined quantity of cold water being received in the lower portion of said water tank for heating therein while the hot water in the upper portion of said water tank continues to flow out of said tank through said cup and said flexible tube and discharge outlet until the level of water in said water tank drops below said discharge outlet.

18. The beverage brewing machine set forth in claim 17, wherein said first stop means and said cup are sufficiently spaced to allow said cup to float upwardly in said tank in response to the expansion of the cold water being heated within said water tank, whereby said cup prevents drippage of the expanding water through said discharge outlet and said discharge head.

19. A beverage brewing machine comprising, in combination, a water tank having a side wall and a bottom wall, a cover having an opening therein and disposed on top of said water tank, thermostatically controlled heating means disposed within said water tank for heating and maintaining water within the tank at a beverage brewing temperature, a discharge outlet in the side wall of said water tank disposed substantially below the top of said water tank, a discharge block disposed in said discharge outlet, said discharge block having a vertically disposed passage extending upwardly from the lower surface thereof, said vertically disposed passage terminating in an outlet passage disposed normal thereto and extending through said discharge outlet in said water tank, a discharge head mounted on spaced relation to said water tank, a discharge water line connecting said outlet passage in said discharge block and said discharge head, means disposed below said discharge head for receiving a beverage producing material to be covered by hot water from said discharge head, and an upstanding tube disposed in said watertank in communication with the opening in said cover, said tube terminating near the bottom wall of said water tank, whereby a manually manipulatable cold water beaker may be employed for pouring a predetermined quantity of cold water through said opening in said cover and directly into said tube without the use of an intermediate water receiving means so as to cause cold water to flow by gravity through said tube into the bottom portion of said water tank in an amount substantially equal to the amount of hot water to be displaced from said water tank through said discharge line onto the beverage producing material and thereby cause a beverage extract to flow into an associated beverage receiving beaker in an amount corresponding to that amount of cold water initially in the cold water beaker, said tube having an inner diameter substantially greater than the inner diameter of said outlet passage so that the flow rate of cold water through the tube and into the bottom of said water tank substantially exceeds the flow rate of the hot water out of said water tank through said outlet passage, whereby the pouring of the full predetermined quantity of cold water into the opening in said cover and through said tube to the bottom of said water tank causes hot water therein to be displaced to the upper portion of said water tank above said discharge block with the full predetermined quantity of cold water being received in the lower portion of said water tank for heating therein while the hot water in the upper portion of said water tank continues to flow out of said tank through said discharge block until the level of water in said water tank drops below the lower surface of said discharge block so that said vertically disposed passage therein provides an air gap between said outlet passage and the bottom surface of said discharge block so as to prevent the siphoning of additional water from said water tank, the lowest portion of said outlet passage and the lower surface of said block being sufficiently spaced so that said vertically disposed passage accommodates the expansion of cold water being heated in said tank without drippage thereof through said outlet passage.

20. A beverage brewing machine comprising, in combination, a water tank having a side wall and a bottom wall, a cover having an opening therein and disposed on top of said water tank, thermostatically controlled heating means disposed within said water tank for heating and maintaining water within the tank at a beverage brewing temperature, a discharge outlet in the side wall of said water tank disposed substantially below the top of said water tank, a discharge head mounted in spaced relation to said water tank, a discharge water line connecting said discharge outlet in said water tank and said discharge head, said discharge head comprising a spray nozzle including a generally circular base having a centrally disposed opening therethrough, a tubular flange extending in a first direction normal to said base and surrounding said opening for connection to said discharge line, an annular flange extending from said base in a direction opposite to said tubular flange, a thin disc disposed within said annular flange and spaced from said base, the axis of said disc being in alignment with the axis of said opening in said base whereby said disc and said annular flange and said base cooperate to define a chamber therebetween, said disc having a plurality of equiangularly spaced openings therethrough for discharging water from said chamber, retaining means for holding said disc in position on said annular flange, means disposed below said discharge head for receiving a beverage producing material to be covered by hot water from said discharge head, and an upstanding tube disposed in said water tank in communication with the opening in said cover, said tube terminating near the bottom wall of said water tank, whereby a manually manipulatable cold water beaker may be employed for pouring a predetermined quantity of cold water through said opening in said cover and directly into said tube without the use of an intermediate water receiving means so as to cause cold water to flow by gravity through said tube into the bottom portion of said water tank in an amount substantially equal to the amount of hot water to be displaced from said water tank through said discharge line onto the beverage producing material and thereby cause a beverage extract to flow into an associated beverage receiving beaker in an amount corresponding to that amount of cold water initially in the cold water beaker, said tube having an inner diameter substantially greater than the inner diameter of said discharge outlet so that the flow rate of cold water through the tube and into the bottom of said water tank substanially exceeds the flow rate of the hot water out of said water tank through said discharge outlet, whereby the pouring of the full predetermined quantity of cold water into the opening in said cover and through said tube to the bottom of said water tank causes hot water therein to be displaced to the upper portion of said water tank above said discharge outlet with the full predetermined quantity of cold water being received in the lower portion of said water tank for heating therein while the hot water in the upper portion of said water tank continues to flow out of said tank through said discharge outlet until the level of water in said water tank drops below said discharge outlet.

21. A beverage brewing machine comprising, in combination, a water tank having a side wall and a bottom wall, a cover having an opening therein and disposed on top of said water tank, thermostatically controlled heating means disposed within said water tank for heating and maintaining water within the tank at a beverage brewing temperature, a discharge outlet in the side wall of said water tank disposed substantially below the top of said water tank, a discharge head mounted in spaced relation to said water tank, a discharge water line connecting said discharge outlet in said water tank and said discharge head, means disposed below said discharge head for receiving a beverage producing material to be covered by hot water from said discharge head, and an upstanding tube disposed in said water tank in communication with the opening in said cover, said tube terminating near the bottom wall of said water tank, whereby a manually manipulable cold water beaker may be employed for pouring a predetermined quantity of cold water through said opening in said cover and directly into said tube without the use of an intermediate water receiving means so as to cause cold water to flow by gravity through said tube into the bottom portion of said water tank in an amount substantially equal to the amount of hot water to be displaced from said water tank through said discharge line onto the beverage producing material and thereby cause a beverage extract to flow into an associated beverage beaker in an amount corresponding to that amount of cold water initially in the cold water beaker, the effective inlet area of said tube being substantially greater than the effective discharge area of said discharge head so that the flow rate of cold water through the tube and into the bottom of said water tank substantially exceeds the flow rate of the hot water out of said water tank through said discharge outlet and said discharge head, whereby the pouring of the full predetermined quantity of cold water into the opening in said cover and through said tube to the bottom of said water tank causes hot water therein to be displaced to the upper portion of said water tank and above said discharge outlet with the full predetermined quantity of cold water being received in the lower portion of said water tank for heating therein while the hot water in the upper portion of said water tank continues to flow out of said tank through said discharge outlet until the level of water in said water tank drops below said discharge outlet.

22. The beverage brewing machine set forth in claim 21, and further comprising a housing enclosing said water tank and said discharge line, said housing having a generally planar top wall, said top wall having an opening therein in alignment with the opening in the cover of said tank, and a funnel extending between the opening in said top wall and said tube to direct the cold water poured into the opening in said housing into said tube.

23. The beverage brewing machine set forth in claim 21, wherein the effective inlet area of said tube is at least three times as great as the effective discharge area of said discharge outlet.

24. The beverage brewing machine set forth in claim 23, wherein the inner diameter of said tube is about 1 3/16 inches and the inner diameter of said discharge outlet is about 5/16 inch.

25. The beverage brewing machine set forth in claim 21, wherein the discharge outlet in said water tank is so disposed in the side wall of said water tank that the volumetric capacity of said water tank between the discharge outlet and the top of the water tank is sufficient to receive at least about 60 ozs. of water when the hot water in the water tank is displaced to the upper portion thereof.

26. The beverage brewing machine set forth in claim 21, wherein said water tank has a volumetric capacity approximately equal to four times the capacity of the associated beakers.

27. The beverage brewing machine set forth in claim 21, wherein the discharge outlet in said water tank is so disposed in the side wall of said water tank that the volumetric capacity of said water tank between the discharge outlet and the top of the water tank is equal to about one-fourth of the entire volumetric capacity of said water tank from the bottom wall thereof to the top 28. The beverage brewing machine set forth in claim 21, wherein the discharge outlet in said water tank is so disposed in the side wall of said water tank that the volumetric capacity of said water tank between the discharge outlet and the top of the water tank is sufficient to receive a quantity of water substantially equal to the capacity of the associated beaker.

29. A discharge head for spraying fluid in a plurality of streams of substantially uniform flow rates and in a particular overall pattern comprising, in combination, a spray nozzle including a base having an opening therethrough, a tubular flange extending in a first direction normal to said base and surrounding said opening for connecting said base to a fluid discharge line, an annular flange extending from said base in a direction opposite to said tubular flange, a thin disc disposed within said annular flange and spaced from said base, the axis of said disc being in alignment with the axis of said opening in said base whereby said disc and said annular flange and said base cooperate to define a chamber therebetween, said disc having a plurality of equiangularly spaced openings therethrough for discharging fluid from said chamber in a plurality of streams at uniform flow rates and in a particular overall pattern, and retaining means disposed within said annular flange and cooperating therewith to hold said disc in position thereon.
thereon.

30. A spray nozzle for spraying fluid in a plurality of streams of substantially uniform flow rates and in a particular overall pattern comprising, in combination, a base having an opening therethrough, means for connecting said base to an associated fluid discharge line with said opening in communication therewith for discharging a stream of hot water therethrough, deflecting means carried by said base downstream of said opening for breaking up the stream of hot water discharging from said opening into a plurality of streams of equal flow rates, said deflecting means having a plurality of discharge openings therein for discharging the plural streams of water and having means for directing the discharging streams outwardly at a predetermined angle relative to the longitudinal axis of the opening in said base, thereby to cause said hot water to be discharged in a particular overall pattern.

References Cited

UNITED STATES PATENTS

| | | | | |
|---|---|---|---|---|
| 3,220,334 | 11/1965 | Martin | | 99—282 |
| 3,332,337 | 7/1967 | Lowry | | 99—282 |
| 3,366,034 | 1/1968 | Karlen | | 99—282 |

ROBERT W. JENKINS, Primary Examiner

U.S. Cl. X.R.

99—295; 239—553.3

UNITED STATES PATENT OFFICE
CERTIFICATE OF CORRECTION

Patent No. 3,479,949                        November 25, 1969

Donald S. Reynolds et al.

It is certified that error appears in the above identified patent and that said Letters Patent are hereby corrected as shown below:

Column 6, line 65, "a bolt" should read -- about --. Column 8, line 43, "extensd" should read -- extends --. Column 9, line 12, ". The" should read -- , the --; line 13, after "water" insert -- in the water --; line 61, "at" should read -- as --. Column 10, line 4, "connetced" should read -- connected --. Column 12, line 66, "supper" should read -- upper --. Column 13, line 9, "tnak" should read -- tank --. Column 18, line 41, after "top" insert -- thereof --; line 68, cancel "thereon".

Signed and sealed this 20th day of October 1970.

(SEAL)
Attest:

Edward M. Fletcher, Jr.                        WILLIAM E. SCHUYLER, JR.
Attesting Officer                               Commissioner of Patents